(12) United States Patent
Mahajan et al.

(10) Patent No.: US 10,836,531 B2
(45) Date of Patent: Nov. 17, 2020

(54) PLASTIC BOTTLE WITH A CHAMPAGNE BASE AND PRODUCTION METHODS THEREOF

(71) Applicant: PepsiCo, Inc., Purchase, NY (US)

(72) Inventors: Kamal Mahajan, Tarrytown, NY (US);
Syed Peer, Arlington Heights, IL (US);
Bruno Telesca, Sandy Hook, CT (US);
Moreno Barel, Refrontolo (IT)

(73) Assignee: PepsiCo, Inc., Purchase, NY (US)

( * ) Notice: Subject to any disclaimer, the term of this patent is extended or adjusted under 35 U.S.C. 154(b) by 171 days.

(21) Appl. No.: 15/344,322

(22) Filed: Nov. 4, 2016

(65) Prior Publication Data

US 2018/0127137 A1 May 10, 2018

(51) Int. Cl.
| | | |
|---|---|---|
| *B65D 1/02* | (2006.01) |
| *B29C 49/28* | (2006.01) |
| *B29B 11/14* | (2006.01) |
| *B29K 67/00* | (2006.01) |
| *B29K 105/00* | (2006.01) |
| *B29K 667/00* | (2006.01) |
| *B29L 31/00* | (2006.01) |

(52) U.S. Cl.
CPC ........... *B65D 1/0284* (2013.01); *B29C 49/28* (2013.01); *B65D 1/0207* (2013.01); *B65D 1/0276* (2013.01); *B29B 11/14* (2013.01); *B29B 2911/1402* (2013.01); *B29B 2911/1404* (2013.01); *B29B 2911/14026* (2013.01); *B29B 2911/1433* (2015.05); *B29B 2911/14033* (2013.01); *B29B 2911/14331* (2015.05); *B29K 2067/003* (2013.01); *B29K 2105/253* (2013.01); *B29K 2667/003* (2013.01); *B29L 2031/712* (2013.01)

(58) Field of Classification Search
CPC .............................. B65D 1/0284; B65D 1/0276
USPC ......................................................... 215/375
See application file for complete search history.

(56) References Cited

U.S. PATENT DOCUMENTS

| | | | | |
|---|---|---|---|---|
| 3,871,541 A | * | 3/1975 | Adomaitis ........... | B65D 1/0284 215/375 |
| 3,881,621 A | * | 5/1975 | Adomaitis .......... | B29C 49/0073 215/12.1 |
| 5,024,339 A | * | 6/1991 | Riemer ................ | B65D 1/0284 215/375 |
| 5,353,954 A | * | 10/1994 | Steward ............... | B65D 1/0284 215/375 |

(Continued)

FOREIGN PATENT DOCUMENTS

| | | |
|---|---|---|
| DE | 8529895.6 U1 | 1/1987 |
| SE | 525568 C2 | 3/2005 |

OTHER PUBLICATIONS

International Search Report and Written Opinion directed to International Patent Application No. PCT/US2017/058293, dated Feb. 5, 2018; 9 pages.

*Primary Examiner* — Fenn C Mathew
*Assistant Examiner* — Jennifer Castriotta
(74) *Attorney, Agent, or Firm* — Sterne, Kessler, Goldstein & Fox P.L.L.C.

(57) ABSTRACT

A beverage container for a carbonated beverage may include a base with a plurality of feet extending therefrom. The feet may act to reinforce a punt in the base of the beverage container to prevent deformation of the base of the beverage container when a carbonated or other pressurized beverage is added to the beverage container.

20 Claims, 7 Drawing Sheets

(56) References Cited

U.S. PATENT DOCUMENTS

| | | |
|---|---|---|
| 6,666,001 B2 | 12/2003 | Mero |
| 8,485,375 B2 * | 7/2013 | Colloud ............... B65D 1/0284 215/375 |
| 2013/0228546 A1 | 9/2013 | Darr et al. |

* cited by examiner

PLASTIC BOTTLE WITH A CHAMPAGNE BASE AND PRODUCTION METHODS THEREOF

SUMMARY

A beverage container with a champagne base is disclosed.

In some embodiments of the present invention, a beverage container includes a body extending along a central axis. In some embodiments, a base is formed monolithically with the body. The base of the beverage container may include a skirt that extends inwards towards the central axis. In some embodiments, the base may also include a punt coupled to the skirt. Feet may be formed on (e.g., extending from) the base of the beverage container. In some embodiments, the areas between the feet define interstitials. In some embodiments, the base includes a skirt and a punt.

In some embodiments, the feet formed on the base of the beverage container cross both the skirt and punt of the beverage container base. Each foot may have a foot sidewall. The foot sidewall may be, for example, perpendicular to a tangent of the base at the sidewall. In some embodiments, feet sidewalls may be formed at approximately 60 degrees to the tangent.

In some embodiments, the punt of the base may have an upper punt portion and a lower punt portion. The upper and lower punt portions may have a concavity. In some embodiments, the concavity of the upper and lower punt portions are opposite. For example, the upper punt portion may be concave while the lower punt portion may be convex. In some embodiments, an inflection line is formed where the upper and the lower punt portions meet. In some embodiments, the inflection line is where a concavity of the punt changes from positive to negative.

In some embodiments, the feet extend only from the lower punt and do not extend from the upper punt. In some embodiments, the base of the beverage container comprises eight feet, as shown. In some embodiments, the base of the beverage container contains a different number of feet, such as, for example, three, four, five, six, seven, or more. In some embodiments, the feet are evenly distributed around the central axis of the bottle on the base of the beverage container. In some embodiments, the feet are integrally formed into the base. In some embodiments, the feet have feet walls extending from the punt. In some embodiments, the feet walls extend from the punt at an angle between 0 and 60 degrees from a normal of the punt.

In some embodiments, the feet reinforce the punt of the base. The feet may act to prevent the punt from deforming and to prevent the base of the beverage container from deforming. The beverage container may be plastic. For example, the beverage container may be polyethylene terephthalate.

In some embodiments, a preform for forming a beverage container is disclosed. The preform may be configured to form a beverage container having a neck, a body, and a base. The preform may have a first end and a second end. In some embodiments, the preform includes a neck extending from the first end towards the second end and a first body section disposed between the neck and the second end. The first body section may include a proximal end and a distal end, and may have a first body section thickness. The first body section thickness may increase between the proximal end and the distal end of the first body section.

The preform may also include a second body section disposed between the first body section and the second end. The second body section may have a proximal end and a distal end. The second body section may have a second body section thickness. In some embodiments, the second body section thickness is constant between the proximal end and the distal end of the second body section.

The base may be positioned between the second body section and the second end, and may itself define the second end. The base may have a proximal end and a distal end. The distal end of the base may have a substantially hemispherical shape.

In some embodiments the ratio of the distance from the proximal end of the first body portion to the second end and the distance from the proximal end of the second body portion to the second end is greater than three. In some embodiments, the second body thickness is greater than the first body thickness.

BRIEF DESCRIPTION OF THE FIGURES

The accompanying drawings, which are incorporated herein and form a part of the specification, illustrate embodiments of the present invention by way of example, and not by way of limitation. Together with the description they further serve to explain principles of the invention and enable a person skilled in the pertinent art to make and use the invention.

DETAILED DESCRIPTION

Figure 1:
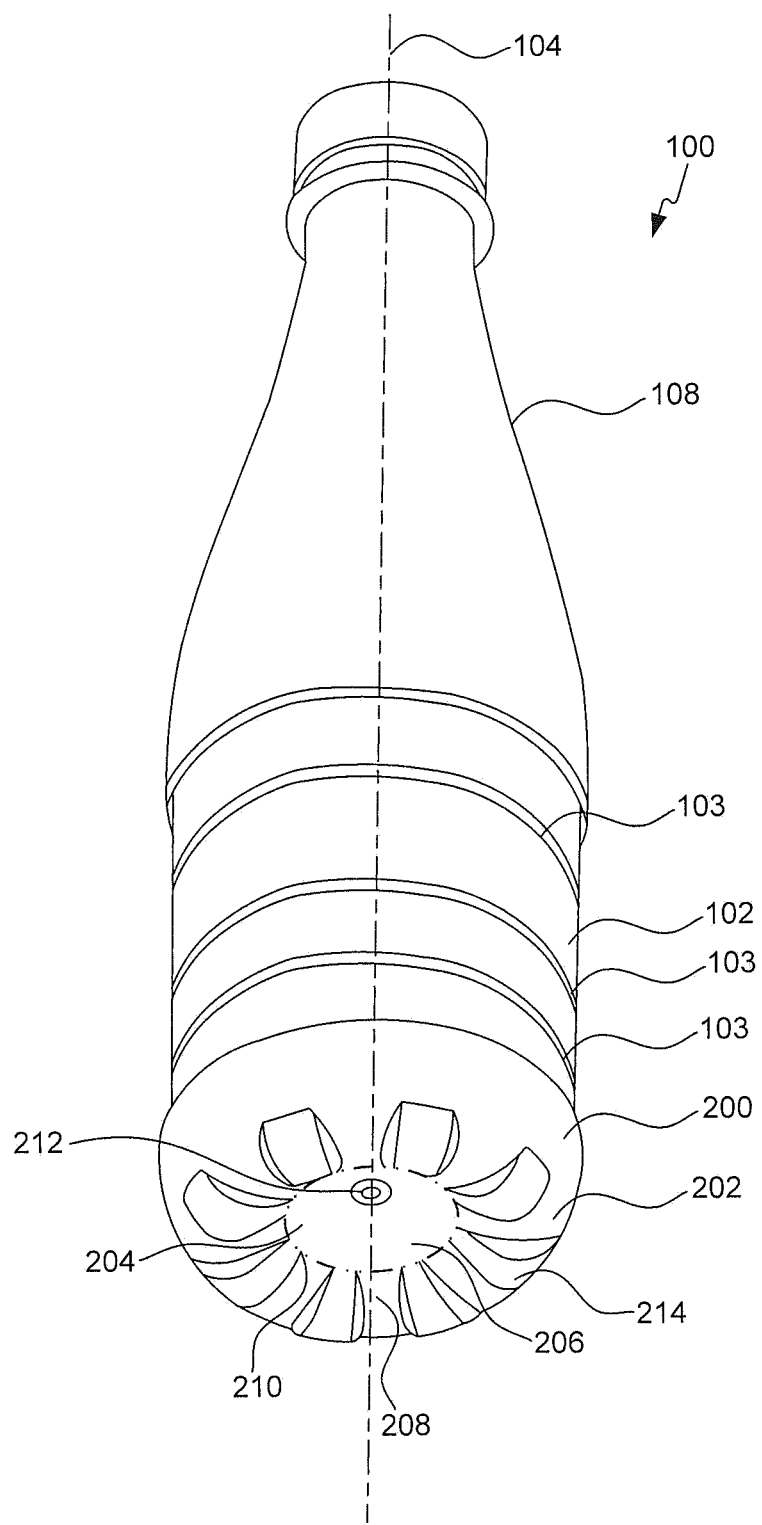
FIG. 1 is a bottom front perspective view of a beverage container according to some embodiments.

The present invention will now be described in detail with reference to embodiments thereof as illustrated in the accompanying drawings. References to "one embodiment," "an embodiment," "an example embodiment," "some embodiments," etc., indicate that the embodiment described may include a particular feature, structure, or characteristic, but every embodiment described may not necessarily include that particular feature, structure, or characteristic. Similarly, other embodiments may include additional features, structures, or characteristics. Moreover, such phrases are not necessarily referring to the same embodiment. When a particular feature, structure, or characteristic is described in connection with the embodiment, it is submitted that it is within the knowledge of one skilled in the art to effect such feature, structure, or characteristic in connection with other embodiments whether or not explicitly described.

The term "invention," "present invention," "disclosure," or "present disclosure" as used herein is a non-limiting term and is not intended to refer to any single embodiment of the particular invention but encompasses all possible embodiments as described in the application.

The systems and methods described herein may be used to produce a beverage container with a champagne base having a plurality of feet disposed thereon.

Plastic beverage containers may contain a variety of beverages including carbonated beverages. Carbonated beverages may include, for example, soda, beer, or carbonated water. Plastic beverage bottles may have a wide variety of bases. For example, a champagne base for a plastic beverage container mimics the look of the classic champagne bottle base. The classic champagne bottle base has a dome structure, or punt, formed into the base with the apex of the punt rising into the area containing the beverage.

In addition to adding an element of elegance to the plastic beverage container, the champagne base has several functional advantages over other base types. For example, unlike a flat bottom of a container which needs only a small imperfection to make it unstable when resting on a surface, a beverage container base with a punt recesses much of the bottom surface of the bottle above a surface on which it rests, thereby reducing the area in contact with the surface that could introduce instability.

Further, the champagne base bottle increases the strength of the base allowing it to hold beverages at a higher pressure. The punt of the champagne base is generally well-suited to the internal pressure of a carbonated beverage contained in a beverage container because of the continuous sloping nature of the punt. This continuous slope helps to minimize concentrations of mechanical stress and distributes the force uniformly across the surface of the punt.

Champagne bases may include bearing zones. Bearing zones may be the area of the beverage container base where the punt transitions to the vertical side walls of the beverage container. The bearing zone may have an arcing cross-section and be present on the base of the beverage bottle. In other words, the beverage container with a champagne base may rest on its bearing zone when the beverage container is upright on a surface. Under some conditions, relatively thin material at the bearing zone may cause an asymmetric deformation of the bearing zone when the beverage container is subjected to pressure from a carbonated beverage in the beverage container. Such deformation of the bearing zone may cause asymmetric swelling of the bearing zone increasing instability of the beverage bottle base. This instability of the beverage bottle base may make the beverage bottle more susceptible to asymmetric leaning or tipping over, since the container rests on its bearing zone when placed on a surface.

Under some conditions, as the bearing zone deforms in conjunction with the geometry of the punt changing. For example, as one part of the bearing zone expands or bulges, areas of the punt may move towards the bulge bringing the punt off of the central axis. This deformation may cause the distribution of force on the surface of the punt to lose its symmetry. The resulting asymmetry of forces on the punt may lead the punt to invert. That is, the punt of the beverage container may change from concave to convex, at least in part. The inversion of the punt may compromise the beverage container's stability and elegant look.

Deformation of the bearing zone can be reduced by adding more material to the base of the beverage bottle to increase the thickness of the bearing zone. The increased thickness may increase the rigidity of the bearing zone thereby reducing deformation. However, the addition of material to the bearing zone undesirably increases the weight and material cost of the container.

Plastic carbonated beverage containers may be made using a preform and a blow molding process. A preform may include a neck, which may have threads or other features configured to mate with bottle caps, and a mold portion extending from the neck. The mold portion may have a long and narrow profile and an inner void (for example, the mold portion may be 2-8 times longer than it is wide). The thickness of the mold portion may be many times greater than the thickness of the resulting beverage bottle (for example 2-20 times greater). In some applications, the preform is secured at the neck portion in a mold. The mold has the shape of the beverage container to be formed. The preform is heated and a driving rod may push the lower extreme of the preform into the base of the mold. In some applications, air is forced into the preform as the drive rod extends. The preform expands into the cavity until it engages the entirety of the cavity. Thus, the relatively thick preform walls become the relatively thin walls of the beverage container.

As noted above, one way to improve the resilience of the bearing zone is to increase the amount of material in the bearing zone. The additional material gives the bearing zone increased rigidity reducing the likelihood of deformation. However, when beverage containers are formed using the blow molding method described above, the addition of material to the bearing zone means adding material to the punt portion as well. Because the punt is relatively stable even without the additional material, the addition of material to the punt adds unnecessary additional weight and material cost to the beverage container.

To achieve the stability and structural integrity of the champagne base without the added weight and cost of extra materials in the base of the beverage container, embodiments described herein include a beverage bottle having feet extending from the base of the beverage container. In some embodiments, the feet extend on to the punt portion of the beverage container to reinforce the punt.

Embodiments of the present invention optimize the structural integrity of a champagne base of a beverage container by increasing the structural stability of the punt. by including feet on the base that alter a force profile of the punt structure allowing the punt to take a greater load from a carbonated beverage contained in the beverage container. The feet act to prevent deformation of the bearing zone and the punt. This prevents asymmetric punt loading. The feet side walls are disposed on the punt and act as support wedge to increase a normal force on the punt to oppose the normal forces created by a carbonated beverage contained in the beverage container. Additionally, the feet act to stabilize the beverage container when the beverage container is placed on a surface, such as a table.

These and other embodiments are discussed below with reference to the figures.

Figure 2:
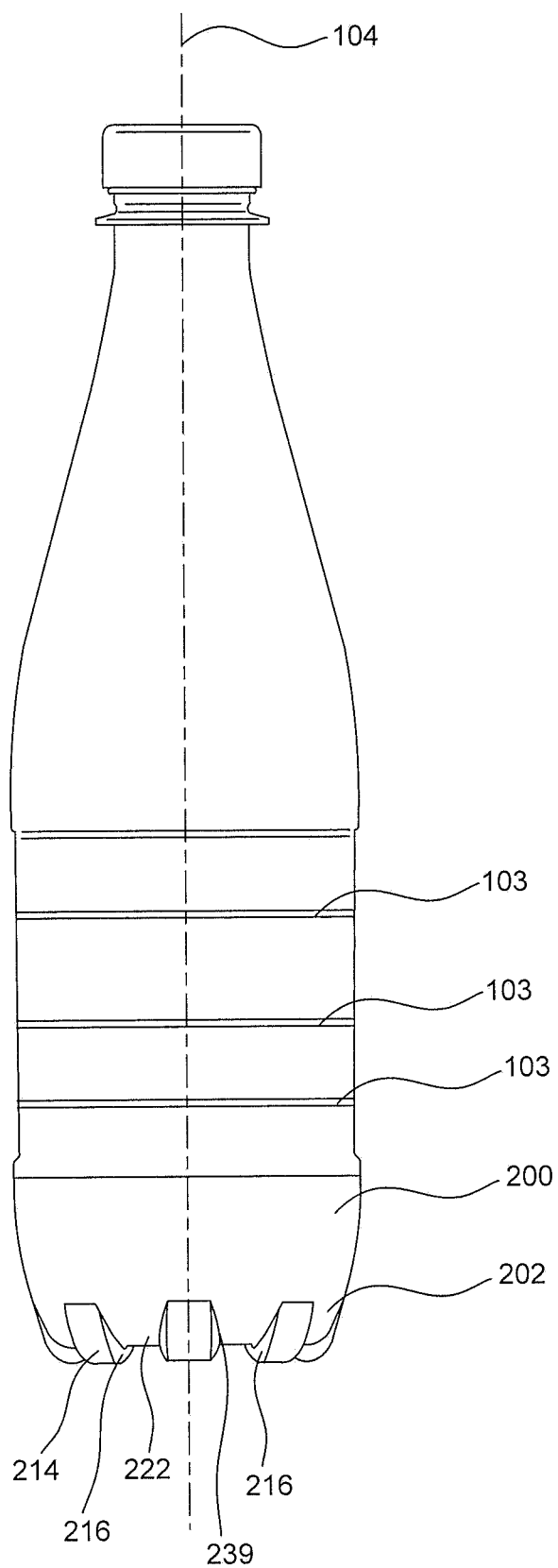
FIG. 2 is a front view of a beverage container according to some embodiments.

FIGS. 1 and 2 show a beverage container 100 having a base 200. Beverage container 100 includes a body 102. In some embodiments, body 102 is formed around a central axis 104. In some embodiments, for example as shown in FIG. 1, body 102 is symmetric around central axis 104. According to some embodiments, a neck 108 is disposed above body 102. Neck 108 may be integrally formed with body 102. Neck 108 may be formed with a plurality of threads or other attachment features configured to mate with a beverage container cap. In some embodiments, the integral formation of neck 108 and body 102 may be from a blow-molding process. The blow-molding process may use preforms such as those described later herein with reference to FIGS. 6-8. In some embodiments, neck 108 includes a removable cap. Neck 108 and body 102 may have any one of several designs and may be symmetrically formed around central axis 104.

Figure 5:
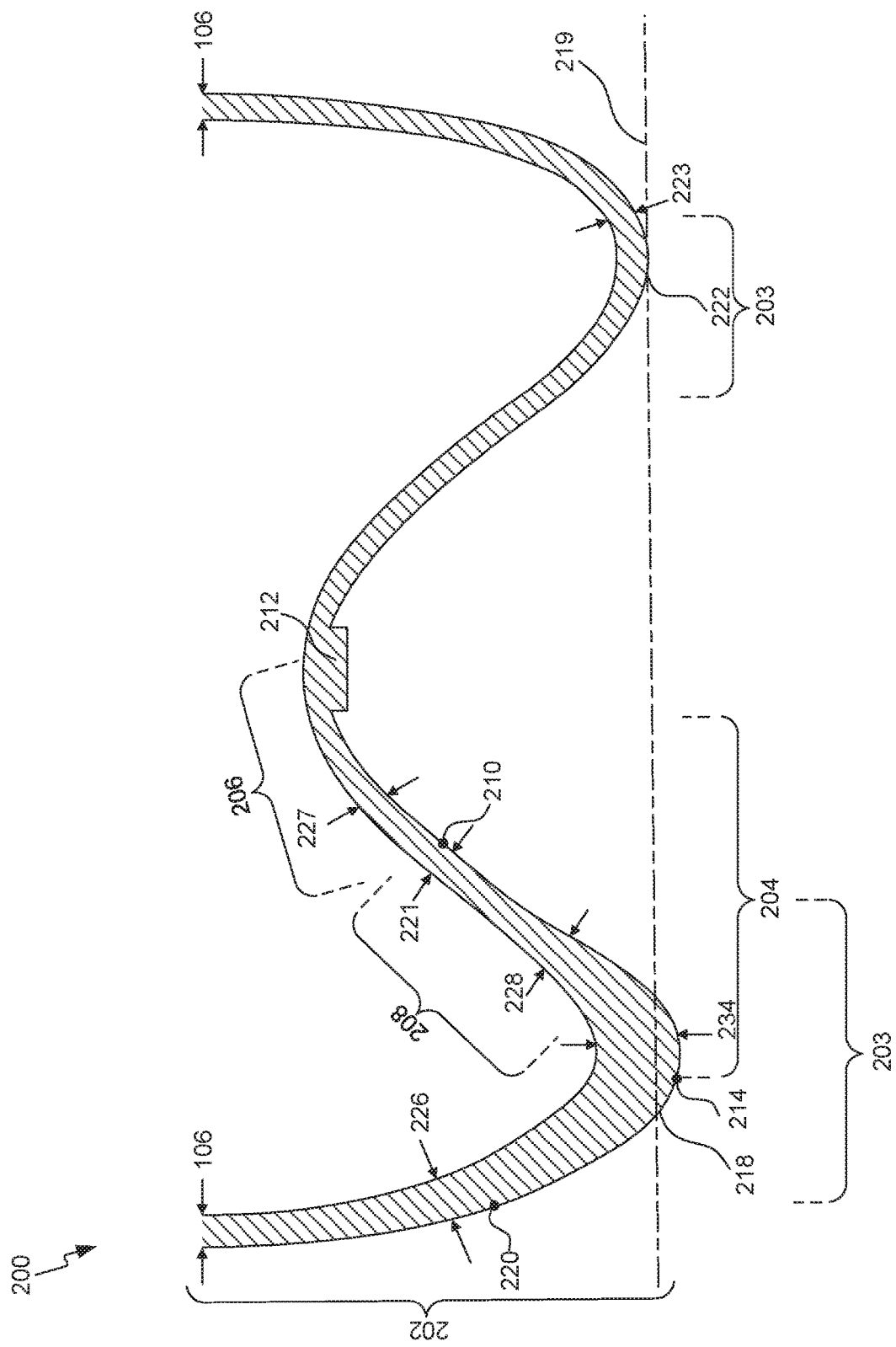
FIG. 5 is a section view of a base of a beverage container taken along line 5-5 of FIG. 4.

In some embodiments, body 102 may have a body thickness 106 (as shown in FIG. 5). Body thickness 106 may be constant throughout body 102 or may vary. In some embodiments, a variation in body thickness 106 may be dependent on a location on body 102. For example, body thickness 106 may be greatest near neck 108. In some embodiments, body 102 may have a label coupled thereto. In some embodiments, body 102 may include ribs 103 formed on or into body 102. Ribs 103 may be formed as troughs in the exterior of body 102 around axis 104. Ribs 103 may provide additional structural stability to beverage container 100 and may allow for greater manufacturing tolerances. In some embodiments, body 102 may have a logo formed thereon.

Figure 4:
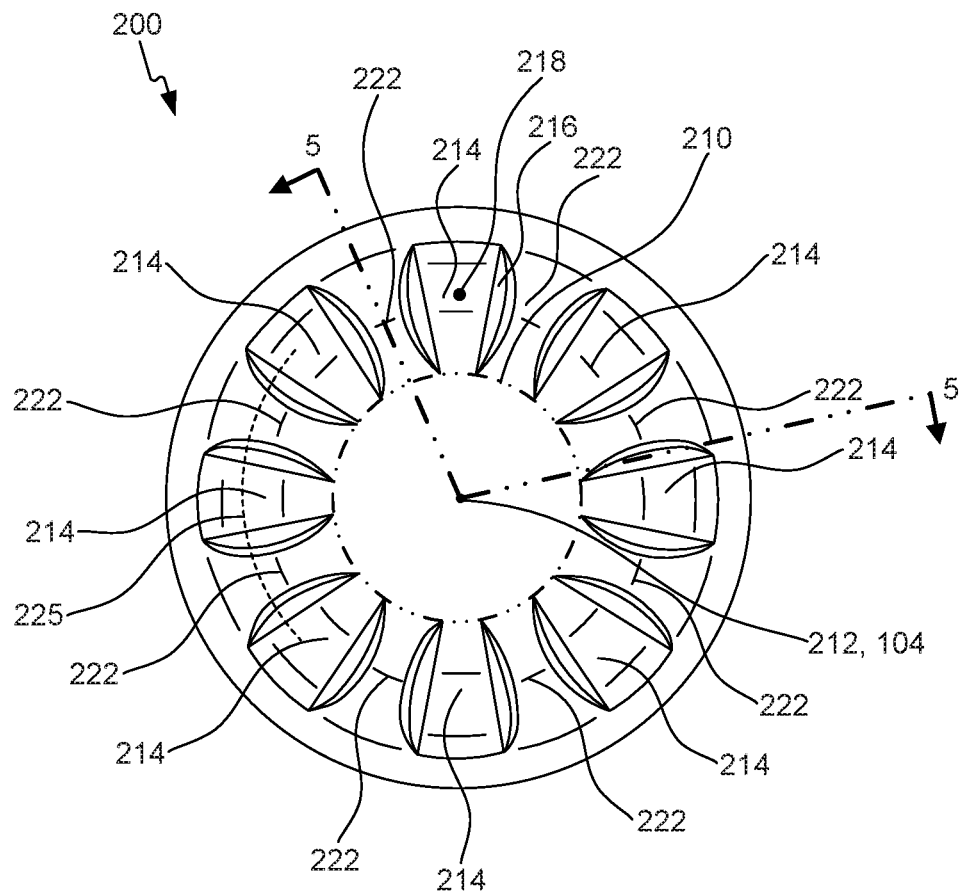
FIG. 4 is a bottom view of a beverage container according to some embodiments.

In some embodiments, a base 200 is coupled to body 102 opposite of neck 108. Base 200 may be integrally formed with body 102 to form beverage container 100. Base 200 may be formed with body 102 using a blow-molding process such as the one described below. In some embodiments, base 200 includes a skirt 202 and a punt 204. Skirt 202 may extend directly from body 102. Skirt 202 may form an upper structure of base 200. Skirt 202, or a portion thereof, may taper towards central axis 104. For example, skirt 202 may be closer to central axis 104 as the distance from body 102 increases. In some embodiments, the rate at which skirt 202 curves into central axis 104 may be constant. In some embodiments, the rate at which skirt 202 curves into central axis 104 may vary. In some embodiments, skirt 202 terminates at a low lower extreme of base 200. For example, skirt 202 may terminate at a transition line 225 (as shown in FIG. 4). Skirt 202 may be coupled to punt 204 at transition line 225.

Figure 3:
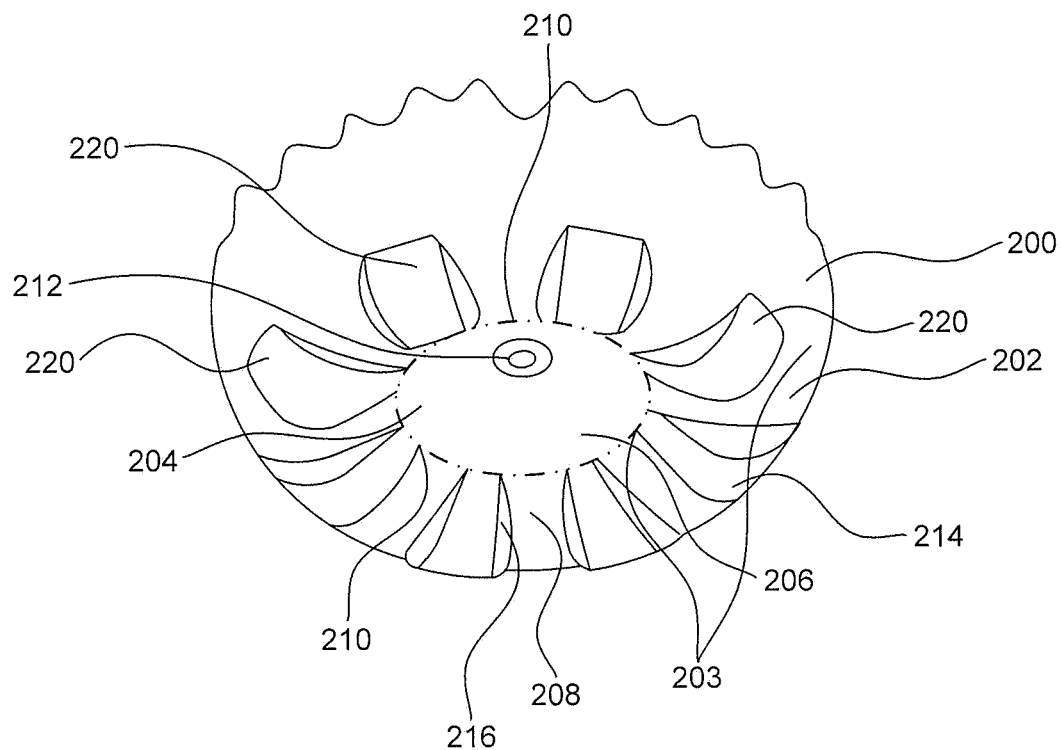
FIG. 3 is a bottom perspective view of a base of a beverage container according to some embodiments.

Punt 204 extends from skirt 202 and is centered around central axis 104. In some embodiments, the transition from skirt 202 to punt 204 occurs across feet 214 and interstitials 222. In some embodiments, punt 204 has an apex 212 at the top of punt 204. FIG. 3 shows a perspective view of base 200. As shown, skirt 202 slopes inward to meet punt 204. Punt 204 may have an upper punt portion 206 and a lower punt portion 208 separated by an inflection line 210.

In some embodiments, base 200 includes feet 214 formed on base 200 of beverage container 100. In some embodiments, interstitials 222 are formed between and separating feet 214. As shown in FIG. 2, interstitials 222 may maintain a constant curve of skirt 202.

In some embodiments, feet 214 begin at a feet exterior wall 220 located on skirt 202. Feet 214 rise out from skirt 202 at feet exterior wall 220 so that they support the rest of base 200 (including skirt 202 and punt 204) above a surface upon which beverage bottle rests.

FIG. 4 shows a bottom view of beverage container 100 having base 200. Feet 214 may be formed symmetrically around central axis 104, which passes through apex 212. In some embodiments feet 214 include feet base 218. Feet base 218 may be, for example, one extreme of beverage container 100 according to some embodiments of the present invention. In some embodiments, feet base 218 support beverage container 100 when beverage container 100 is set upright on a surface perpendicular to central axis 104.

FIG. 5 shows a cross-sectional view of base 200 taken along line 5-5 of FIG. 4. As indicated in FIG. 4, the cross section shown in FIG. 5 shows a cross section of base 200 through feet side walls 216 on the left side of FIG. 5 and a cross section of base 200 through interstitial 222 on the right side of FIG. 5. Skirt 202 has a skirt thickness 226. Skirt thickness 226 near body 102 may be substantially the same as a body thickness 106 of body 102 near skirt 202 (i.e., body thickness 106 and skirt thickness 226 may be within 10% of one another). In some embodiments, skirt thickness 226 may be different at different points along skirt 202. For example, skirt thickness 226 may increase along skirt 202 nearer to central axis 104. In some embodiments, skirt thickness 226 remains constant.

Skirt 202 may terminate at a lower line 219. At lower line 219, skirt 202 may be coupled to punt 204. Punt 204 may have a substantially domed shape and may have apex 212 at the top. Punt 204 may include a lower punt portion 208 and an upper punt portion 206. In some embodiments, lower punt portion 208 is coupled to skirt 202 on one side and upper punt portion 206 on the other side. That is, lower punt portion 208 may be disposed between upper punt portion 206 and skirt 202. In some embodiments, the transition from lower punt portion 208 to upper punt portion 206 may be defined as inflection line 210. In some embodiments lower punt portion 208 is convex while upper punt portion 206 is concave. A convex concavity may be described as a positive concavity while a concave concavity may be described as a negative concavity.

In some embodiments lower punt portion 208 has a lower punt thickness 228. Lower punt thickness 228 may decrease across lower punt portion 208 from a maximum lower punt thickness 228 where lower punt portion 208 meets skirt 202 to a minimum lower punt thickness 228 where lower punt portion 228 meets upper punt portion 206. In some embodiments, lower punt thickness 228 describes only the thickness of lower punt portion 208. In some embodiments, lower punt thickness 228 is substantially the same as the thickness of feet 214 or of interstitials 222 (i.e., lower punt thickness 228 and the thickness of feet 214 or of interstitials 222 may be within 10% of one another).

In some embodiments, upper punt portion 206 is hemispherical and is centered on central axis 104. Upper punt portion 206 may have apex 212 located on central axis 104. Apex 212 may be the highest point in the champagne base beverage container base. Apex 212 may also include a extruding marker (shown as a rectangular offshoot of apex 212 in FIG. 5). Extruding marker may occur as a result of a blow mold manufacturing process such as the blow mold manufacturing process set out below. In some embodiments, upper punt portion 206 has upper punt thickness 227. Upper punt thickness 227 may increase across upper punt portion 206 from lower punt portion 208 to apex 204.

FIGS. 1-4 show feet 214 formed on base 200. According to some embodiments, feet 214 are formed in base 200 using a blow-molding process such as, for example, the one described below. In some embodiments, feet 214 are integrally formed into base such that feet 214 and base 200 are formed of one material as a single piece. Each foot 214 may have a foot exterior wall 220 extending from a portion of base 200. Each foot 214 may have a foot side walls 216. Feet side walls 216 may support punt 204. In some embodiments, feet side walls 216 may be coupled to base 200 at an angle 239 with a normal of the surface of base 200 where the foot wall 216 meets interstitial 222 (e.g., with respect to vertical direction of axis 104). In some embodiments, angle 239 is 0-60 degrees. In some embodiments, angle 239 is 0-30. In some embodiments, as shown, for example, in FIG. 2, angle 239 is 30 degrees.

Feet side walls 216 resist the deformation of punt 204 when beverage container 100 is filled with a carbonated beverage. When filed with a carbonated beverage, the pressure of the carbonated beverage exerts a force on punt 204. The force exerted on punt 204 by the carbonated beverage has a net force that is downward. Feet side walls 216 act as supports for punt 204. Feet side walls 216 apply an upward force on punt 204 without deforming, due in part to their upright orientation. The upward force from feet side walls 216 allows for beverage container 100 to contain a beverage at a higher pressure with the same amount of material forming beverage container. Beverage container 100 may also be made with less material than standard bottles required to house carbonated beverage.

In some embodiments, feet 214 may have feet exterior walls 220 extending from skirt 202. As shown in FIG. 5, feet exterior walls 220 may transition to feet bases 218. In some embodiments, feet bases 218 may be a lower extreme of beverage container 100. Feet 214 may act as a support for beverage container 100 when beverage container 100 is placed on a flat surface such as a table. In some embodiments, feet 214 do not extend on to upper punt portion 206. That is, feet 214 do not extend beyond inflection line 210. In some embodiments, feet 214 extend on to upper punt portion 206 and may extend as far as apex 212. In some embodiments individual feet 214 extend different amounts on punt 204.

A specific shape of feet 214 is not required to achieve the benefit of the present invention. In some embodiments, feet 214 have a substantially trapezoidal cross section (as seen in FIG. 4). In some embodiments, feet 214 may have shapes different than shown in the FIGS., such as, for example, a substantially square or rounded cross section. Also for example, feet exterior walls may be concave or convex, or may have an asymptotic or quadratic character. In some embodiments, different shaped feet 214 may be formed on base 200 simultaneously. That is, a single beverage container 100 may have different styles of feet 214 formed thereon. As shown, in some embodiments a transition between foot side wall 216 and foot exterior wall 220 takes the form of a corner or crease, as does a transition between foot side wall 216 and interstitial 222, which can help direct forces due to internal pressure to foot side walls 216.

FIG. 5 is a cross-section of base 200 taken through an interstitial 222 and a foot side wall 216. As shown on the left side of FIG. 5, feet side walls 216 are formed in base 200. FIG. 5 shows bearing zone 203. In some embodiments bearing zone 203 is located be the beginning of feet exterior wall 220 and inflection line 210. In some embodiments, bearing zone 203 may be smaller or larger than the indicated zone of FIG. 5. Further, bearing zone 203 may be more or less steep than bearing zone 203 shown in FIG. 5. In some embodiments, bearing zone 203 includes feet 214 and interstitials 222. In some embodiments, interstitials 222 are formed between feet 214. When beverage container 100 is filled with a carbonated beverage, feet side walls 216, being disposed at approximately 60-90 degrees to a tangent line formed on bearing zone 203 reinforces the bearing zone by redirecting the pressure in the bearing zone.

In some embodiments, bearing zone 203 has a variety of thicknesses. For example, bearing zone 203 may have a thickness that varies between a sidewall thickness 234 and an interstitial thickness 223. In some embodiments, bearing zone 203 may be thinnest at inflection line 210 having inflection point thickness 221.

A method of forming a beverage container disclosed herein will now be described in detail with reference to the accompanying figures.

Figure 6:
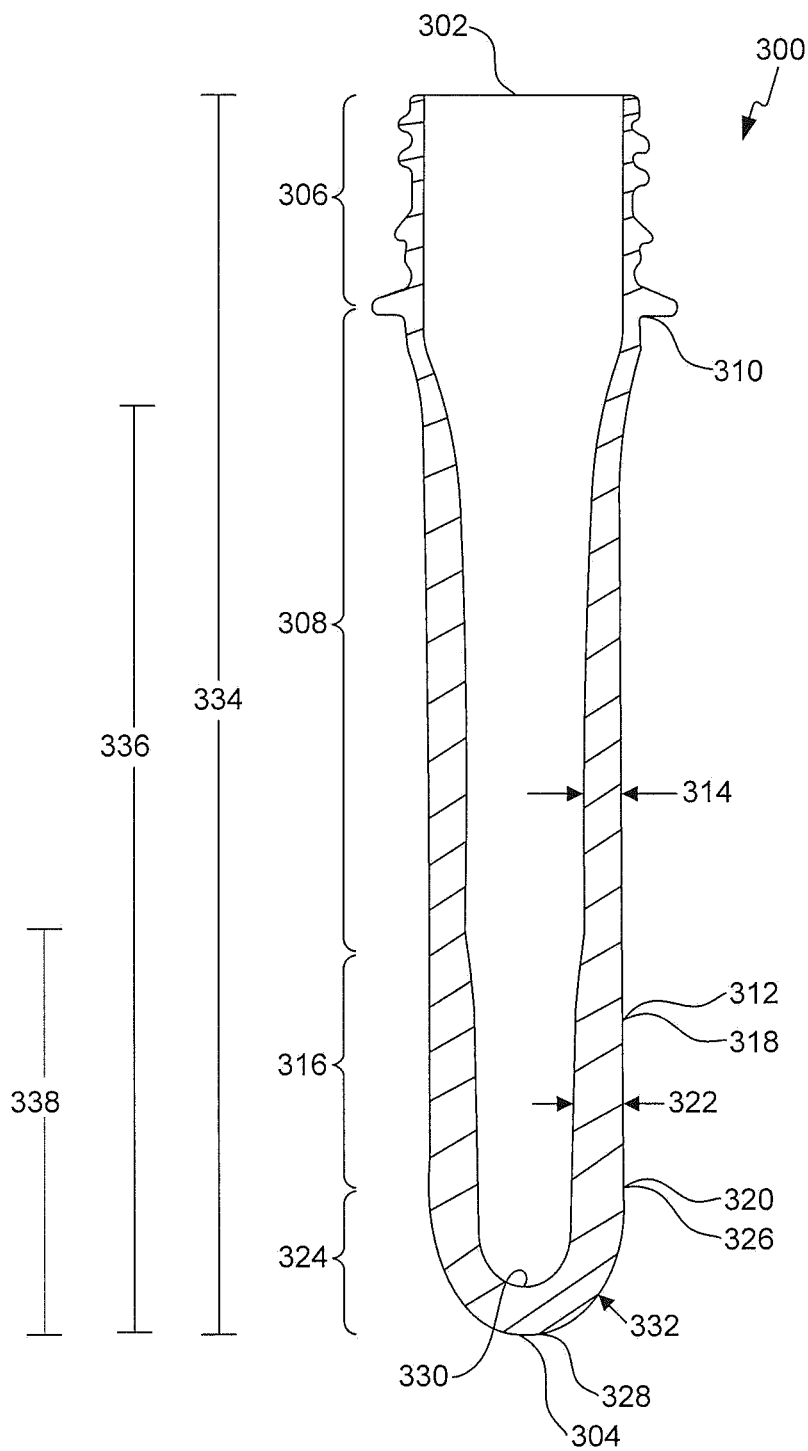
FIG. 6 is a sectional view of a preform according to some embodiments.

FIG. 6 shows a preform 300. In some embodiments, preform 300 has a preform first end 302 and a preform second end 304. Preform first end 302 and preform second end 304 may define opposite ends of preform 300 along a major axis of preform 300. In some embodiments, preform 300 includes a preform neck 306 extending from preform first end 302 in the direction of preform second end 304. In some embodiments, preform 300 includes a preform first body 308 extending from preform neck 306 in the direction of preform first end 302. In some embodiments, preform 300 includes a preform second body 316 extending from preform first body 308 in the direction of preform second end 304. Preform 300 may include preform base 324 extending from preform second body 316 in the direction of preform second end 304.

In some embodiments, preform first body 308 has preform first body proximal end 310 and preform first body distal end 312. Preform second body 316 extends from preform first body distal end 312. Preform first body 308 has preform first body thickness 314. In some embodiments, preform first body thickness 314 increases from preform first body proximal end 310 to preform first body distal end 312. In some embodiments, the increase of preform first body thickness 314 is linear from preform first body proximal end 310 to preform first body distal end 312. In some embodiments, the increase is quadratic or asymptotic. In some embodiments, the increase is linear in portions of preform first body 308, non-linear in other portions, or unchanged.

In some embodiments, preform second body 316 has preform second body proximal end 318 and preform second body distal end 320. Preform base 324 extends from preform second body distal end 320. Preform second body 316 has preform second body thickness 322. In some embodiments, preform second body thickness 322 increases from preform second body proximal end 318 to preform second body distal end 320. In some embodiments, the increase of preform second body thickness 322 is linear from preform second body proximal end 318 to preform second body distal end 320. In some embodiments, the increase is asymptotic. In some embodiments, the increase is linear in portions of preform second body 316, non-linear in other portion, or unchanged. As shown in FIG. 6, preform second body thickness 322 is constant.

In some embodiments, preform base 324 coupled to preform second body distal end 320 has a hemispherical base 330. In some embodiments, hemispherical base 330 has a uniform thickness. In some embodiments, the thickness 332 of hemispherical base 330 thickness decreases nearer the apex of hemispherical base 330. In some embodiments, hemispherical base 330 has base proximal end 326 and base distal end 328. In some embodiments, base distal end 328 and preform second end 304 are the same.

As shown in FIG. 6, a distance from preform first end 302 to preform second end 304 is given as first distance 334. In some embodiments, first distance 334 may be between 90 mm and 100 mm. A distance from first body proximal end 310 to preform second end 304 is given as second distance 336. In some embodiments, second distance 336 may be between 60 mm and 90 mm. A distance from preform second body proximal end 318 to preform second end 304 is given as third distance 338. In some embodiments, third distance 338 may be between 15 mm and 40 mm. A first ratio may be defined as the ratio between second distance 334 and third distance 338. In some embodiments, the first ratio is between 1 and 5 (e.g., between 2 and 4, such as, for example, 3). In some embodiments, increasing the first ratio may be necessary to form beverage container 100 having base 200 with feet 214 formed thereon. Feet 214 increase the surface area of base 200. Therefore, preform 300 used to form beverage container 100 having base 200 with feet 214 will require slightly more material to be in the base than a preform 300 used to create beverage container 100 having base 200 without feet formed thereon. Preform 300 used to form beverage container 100 having base 200 with feet 214 formed thereon may still uses less material than a comparable beverage container because beverage container 100 with base 200 having feet 214 is more structurally sound when compared to beverage container 100 with base 200 not having feet 214.

In some embodiments, preform 300 used to create beverage container 100 having base 200 as disclosed herein is longer than a standard preform that would be used to create a beverage container of the same volume. In some embodiments, preform 300 as disclosed herein weighs less than a standard preform to create a beverage container of the same volume. In some embodiments, preform 300 is used to form beverage container 100 having a 500 mL volume. Preform 300 may be used to produce beverage container 100 having feet 216, where such beverage container 100 has the same or greater structural integrity and stability as, but weigh less than, a beverage container of the same volume formed without feet. For example, preform 300 used to produce beverage container 100 having feet 216 and a volume of approximately 500 ml may have a preform weight of 23 g while a preform used to produce a beverage container of the same structural integrity and stability without feet 216 may have a preform weight of 27 g. Thus, preform 300, and by implication beverage container 100 with feet 216, provides a weight savings of 4 g. Structural integrity and stability can be assessed as the ability of a container to accommodate a given internal pressure without deformation. For example, structural integrity may be described as an ability or a measure of a container's ability to resist deformation under load. For example, stability may be described as a container's ability to resist tipping over.

Figure 7:
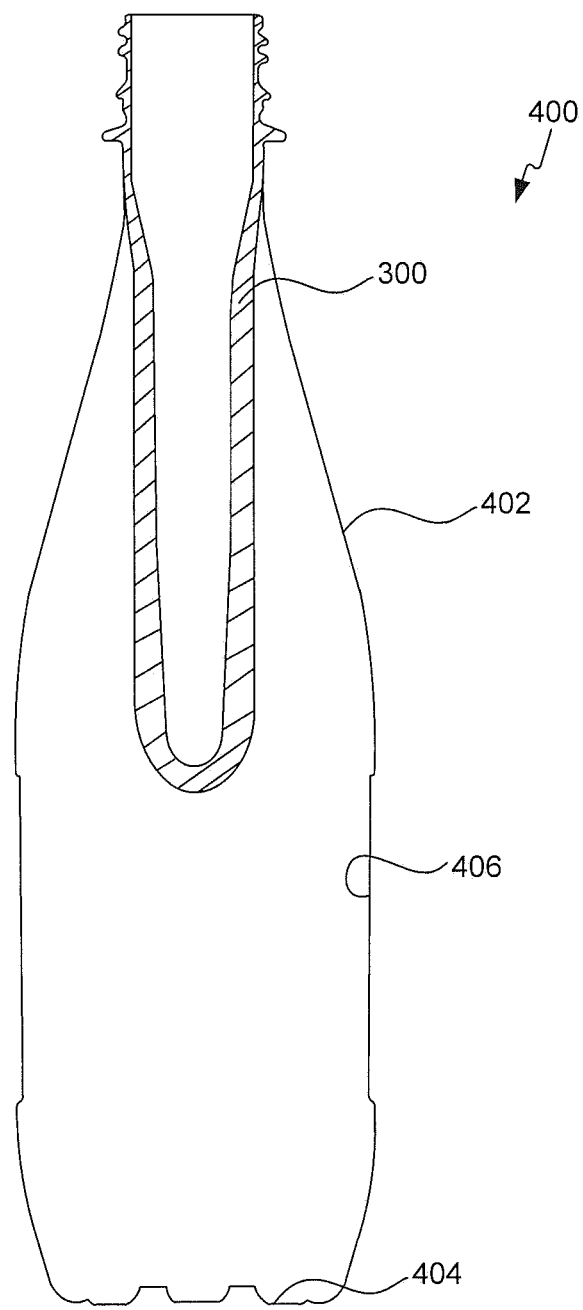
FIG. 7 is a sectional view of a preform in a beverage container blow mold apparatus according to some embodiments.

FIG. 7 shows preform 300 in blow-molding apparatus 400. In some embodiments, preform 300 is heated in blow molding apparatus 400 and air is injected into the open end of preform 300. The heat increases the elasticity of preform 300 and the air pressure forces preform 300 to expand into blow mold cavity 402. As preform 300 expands into blow-mold cavity 402, preform 300 comes into contact with blow-mold cavity sidewall 406. Blow-mold cavity sidewall 406 may be cooled such that the heated preform 300 begins to harden when preform 300 is in contact with blow-mold cavity sidewall 406. Preform 300 is expanded into blow-mold cavity 402 and form feet 214 at feet formation area 404. Once preform 300 has fully expanded into preform cavity 402, preform 300 is cooled and removed from blow mold cavity 402 resulting in a formed beverage container 100.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A beverage container comprising:
 a body extending longitudinally on a central axis;
 a base, comprising:
  a skirt extending from the body towards the central axis; and
  a punt extending from a lower extreme of the skirt;
 feet extending from the skirt and the punt such that each foot crosses both the skirt and the punt; and
 interstitials extending across the skirt and the punt between the feet, each interstitial having a minimum interstitial width at a single point,
 wherein a transition from the punt to the skirt at each interstitial is smooth,
 and wherein the width of each interstitial continuously increases from the single point towards the body and towards an apex of the punt.

2. The beverage container of claim 1, wherein each of the feet has a sidewall, and wherein the sidewall is substantially perpendicular to a tangent of the base.

3. The beverage container of claim 1, wherein the punt comprises an upper punt portion having an upper punt concavity and a lower punt portion having a lower punt concavity, the upper punt concavity and the lower punt concavity being opposite.

4. The beverage container of claim 3, wherein the feet extend from the lower punt portion.

5. The beverage container of claim 1, wherein the feet comprises eight feet.

6. The beverage container of claim 1, wherein the feet are evenly distributed around the central axis.

7. The beverage container of claim 1, wherein the feet are integrally formed into the base.

8. The beverage container of claim 1, wherein the base is a champagne base.

9. The beverage container of claim 1, wherein the bottle is formed using a blow-molding process.

10. The beverage container of claim 1, wherein the plurality of feet reinforce the punt.

11. The beverage container of claim 10, wherein feet provide a normal force on the punt.

12. The beverage container of claim 1, wherein the feet further comprise feet walls extending from the punt, wherein the feet walls extend from the punt at an angle between 0 and 60 degrees with respect to the longitudinal direction.

13. The beverage container of claim 1, wherein the beverage container is formed of polyethylene terephthalate.

14. The beverage container of claim 1, wherein each of the feet has a sidewall, and wherein the sidewall comprises a convex curve.

15. The beverage container of claim 1, wherein the smooth transition from the punt to the skirt is disposed centrally between adjacent feet.

16. The beverage container of claim 1, wherein each foot has a sidewall thickness, and wherein the sidewall thickness is greater than an interstitial thickness.

17. The beverage container of claim 1, wherein each foot is entirely convex.

18. The beverage container of claim 1, wherein the smooth transition from the skirt to the punt occurs across the feet and the interstitials.

19. The beverage container of claim 1, wherein a sidewall of each foot is convex outward.

20. A beverage container comprising:
a body extending longitudinally on a central axis;
a base, comprising:
   a skirt extending from the body towards the central axis; and
   a punt extending from a lower extreme of the skirt;
feet extending from the skirt and the punt such that each foot crosses both the skirt and the punt; and
interstitials extending across the skirt and the punt between the feet, wherein a transition from the punt to the skirt at each interstitial is smooth, and
wherein a width of each interstitial continuously increases from a minimum width of the interstitial towards the body and towards an apex of the punt,
wherein a thickness of the sidewall of each foot is greater than a thickness of the punt.

\* \* \* \* \*